Aug. 24, 1937.   G. W. HOPKINS   2,090,978
SAW SET
Filed Sept. 16, 1936   2 Sheets-Sheet 2
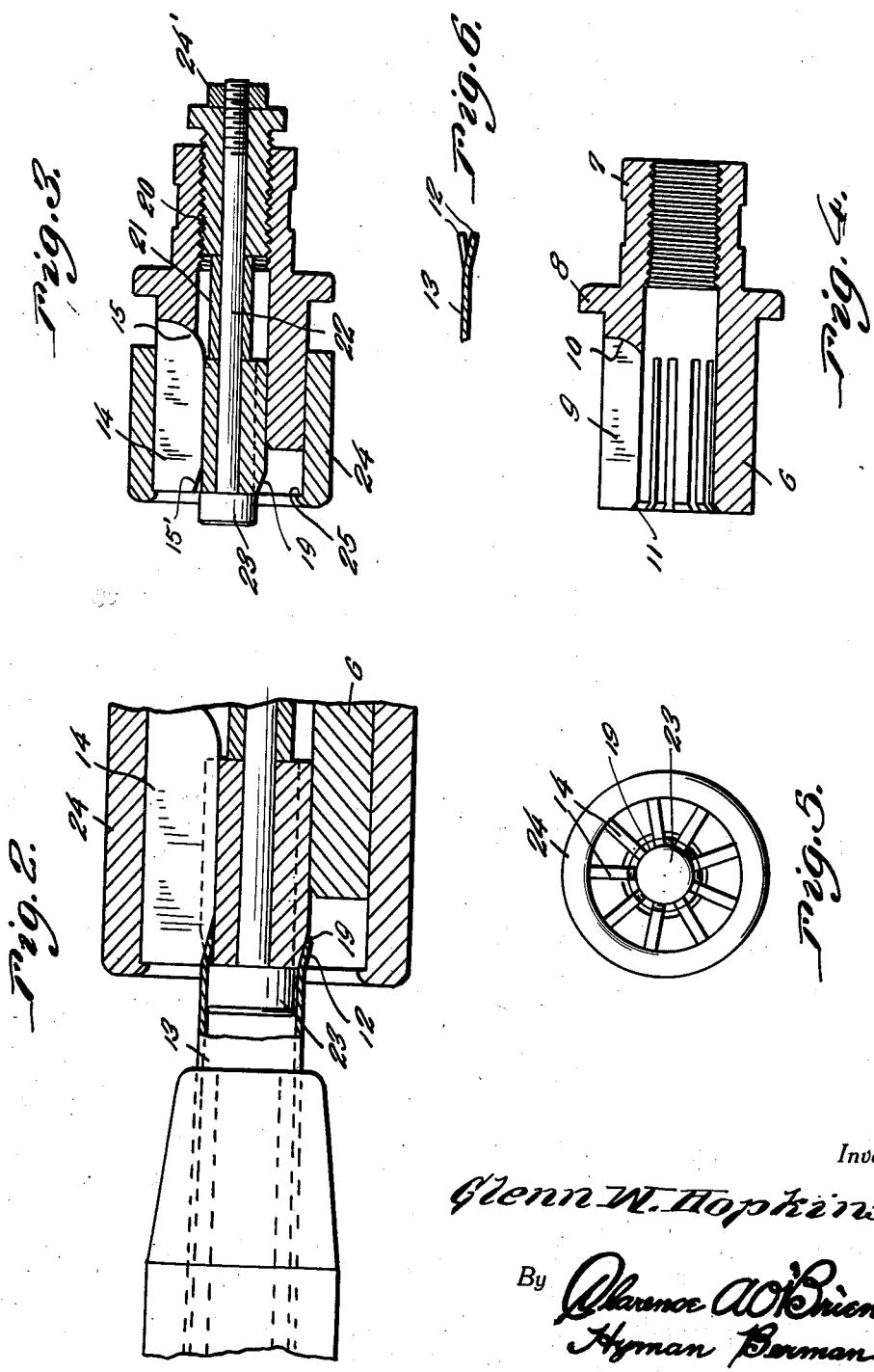
Inventor
Glenn W. Hopkins
By Clarence A. O'Brien
Hyman Berman
Attorneys Patented Aug. 24, 1937

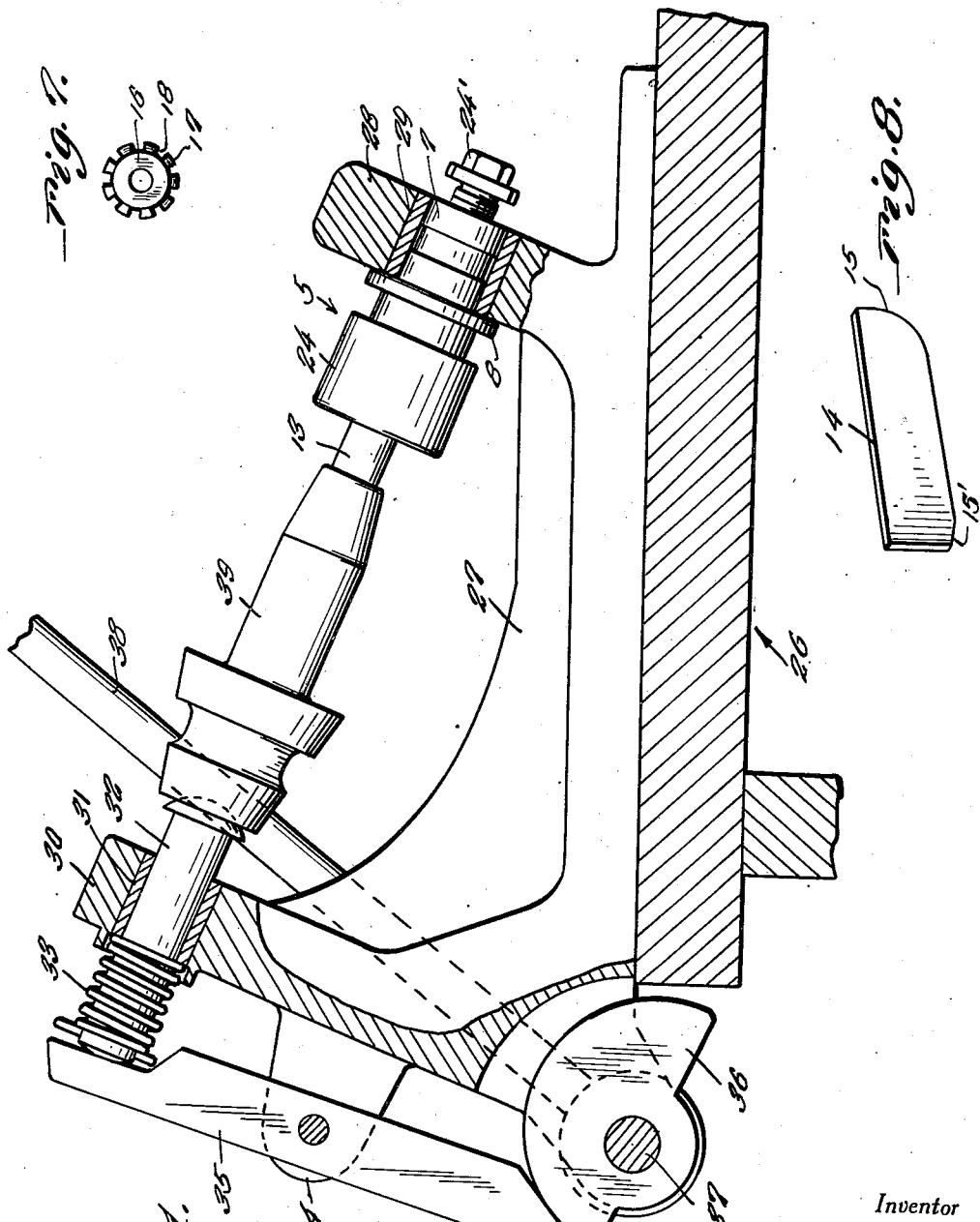

2,090,978

UNITED STATES PATENT OFFICE 2,090,978

SAW SET

Glenn W. Hopkins, Paducah, Ky., assignor to McKee Button Company, Muscatine, Iowa, a corporation of Iowa Application September 16, 1936, Serial No. 101,143

6 Claims. (Cl. 76—58)

This invention relates to devices for setting saw teeth and more particularly for setting the teeth of tubular saws of the type used on button cutting or sawing machines for cutting button blanks from shells or the like.

An object of the present invention is to provide a device which will insure the setting of the teeth in a positive and efficient manner, and the invention consists in the provision of a construction, combination and arrangement of parts as will be best understood from a study of the following description taken in connection with the accompanying drawings wherein:—

Figure 1 is a view partly in section and partly in elevation illustrating the application of the improved saw set.

Figure 2 is an enlarged fragmentary sectional view through a portion of the set and showing the manner of engaging the same with the teeth of the saw.

Figure 3 is a longitudinal sectional view through the set.

Figure 4 is a longitudinal sectional view through a body member of the set.

Figure 5 is an end elevational view of the saw set.

Figure 6 is a fragmentary detail sectional view through the tubular saw illustrating how alternate teeth of the saw are bent inwardly and intermediate teeth of the saw are bent outwardly with respect to the tubular body of the saw.

Figure 7 is an end elevational view of an insert forming part of the set.

Figure 8 is a perspective view of a blade.

Referring to the drawings by reference numerals it will be seen that the improved saw set indicated generally by the reference numeral 5, in the preferred embodiment thereof comprises a tubular member 6 having a reduced end 7 and a shoulder 8 at the junction of the two diameters of the member 6.

The largest diameter of the member 6 is provided with a series of circumferentially spaced slots 9 elongated longitudinally and having rounded inner end walls 10. At the free end of the largest diameter thereof the body 6 has its interior wall bevelled as at 11.

The number of slots 9 in the body member 6 will correspond to one half the number of teeth 12 of the tubular saw 13.

Arranged in each slot 9 is a blade 14 and each blade 14 has a rounded inner end 15 that bears against the wall 10 of the slot 9 while at the forward end thereof the blade 14 at its lower edge is bevelled off as at 15'.

Accommodated within the largest diameter of the member 6 is an insert 16 which latter is in the form of an axially bored cylindrical body provided on its periphery with a series of relatively spaced ribs 17 adapted to receive in the spaces 18 therebetween the blades 14 as clearly shown in Figures 2, 3 and 5. At one end thereof the ribs 17 are bevelled off as at 19 to accommodate the outturned teeth 12 of the saw 13, the inturned teeth 12 of the saw being accommodated in the spaces 18 and by the bevelled corners 15' of the blades 14.

Screw threadedly engaged with complemental threads provided internally of the smaller diameter 7 of the members 6 is a gland member 20 and disposed between the inner end of the member 20 and the insert 16 is a tubular sleeve 21.

Extending axially through the member 16, sleeve 21 on the gland 20 is a rod 22 which at one end is provided with a cylindrical head 23, and at its relatively opposite end is threaded to receive a nut 24 as clearly shown in Figure 3.

The diameter of the head 23 corresponds to the diameter of the button blank or disk to be cut by the saw 13 so that consequently the head 23 fits snugly within the tubular body of the saw 13 as shown in Figure 2. In this connection it will be also noted that the diameter of the head 23 is slightly greater than the diameter of the body of the insert 16 and is of such diameter that the periphery thereof will not project radially beyond the bevelled ends 19 of the ribs 18.

Sleeved on the largest diameter of the member 6 is a relatively short cylindrical member 24 which serves to retain the blades 14 against radial outward displacement, and at one end the member 14 is formed to prevent an inwardly directed flange 25 that bears against the adjacent ends of the blades 14 for urging the blades inwardly so as to seat the edges 15 thereof firmly against the walls 10 of the slots 9.

In using the saw set resort may be had to the usual saw setting stand shown in Figure 1 and indicated by the reference numeral 26.

The stand 26 is of conventional construction and embodies a base 27 having at one end an inclined lug 28 having an opening therein lined by a bushing 29 and adapted to accommodate, in the present instance the small diameter 7 of the saw set body member 6. At its relatively opposite end the base 27 is provided with an inclined lug 30 having an opening therein lined by a bushing 31 and adapted to accommodate the plunger 32 that is normally urged in one direction through the medium of a suitable spring assembly 33.

At the lug equipped end 30 thereof the saw setting tool includes ears 34 between which is pivoted the lever 35 that has an end bearing against the outer end of the plunger 32 and a second end bearing against a cam 36 mounted on a stub-shaft 37 provided at one end with an operating handle or lever 38.

In using my improved saw setting device 5 with the saw setting table and assembly just described, the smallest diameter 7 of the body member 6 of the saw set 5 is fitted within the bushing 29 with the saw spindle 39 disposed with its head engaged with the plunger 32 and the tubular body of the saw 13 receiving the pilot head 23 of rod 24 as shown in Figure 2.

With the parts arranged as shown in Figures 1 and 2 the lever 38 is manipulated for actuating the hammer member 35 through the cam 36 in a manner to cause the hammer to forcibly strike the plunger 32 for moving the plunger inwardly against the spring 33. This will result in the saw 13 being moved axially of the setting device 5 with the inturned teeth of the saw being forced under the bevelled corners 15' of the blades 14 and the outturned teeth of saw 13 forced to ride over the bevelled ends 19 of the ribs 17 resulting in a proper setting of the teeth 12 of the saw. Thus it will be seen that the teeth of the saw may be set in a quick positive and efficient manner.

As is well understood as the blades 14 and insert 16 wear they must be ground off and the arrangement is such that the parts of the set 5 may be readily separated and disassembled so as to permit the grinding of the blades 14 and the insert 16. After the insert 16 and the blades have been ground the parts are reassembled, the rod 22 serving to hold the parts 16, 21 and 20 in axially assembled relation, and these parts may be adjusted relative to the body 6 as may be found desirable by turning the gland 20 to feed the same axially of the member 6.

It is thought that a clear understanding of the construction, utility and advantages of the improved saw set will be had without a more detailed description.

Having thus described the invention what is claimed is:—

1. A device for use in setting the teeth of tubular saws and comprising a tubular body member provided at one end with a series of circumferentially spaced slots, an insert within said body member and provided on its periphery with a series of circumferentially spaced ribs, individual blade members removably engaged in said slots and having inner longitudinal edges engaging in the spaces between said ribs, said ribs at one end being bevelled and said blades having bevelled corners, at the ends thereof adjacent to the bevelled ends of said ribs, whereby said ends of the blades and ribs are provided to engage the teeth of the saw for setting the latter incidental to relative axial movement of the saw and the device.

2. A saw tooth setting assembly for use on a conventional saw tooth setting stand and including a two diameter hollow cylindrical body, said body being provided with a series of circumferentially-spaced slots in the large diameter thereof, said slots equalling in number one half of the total number of teeth with which the saw to be acted upon is equipped, individual saw tooth setting blades removably engaged in said slots and provided at one end with beveled corners to engage alternate teeth of the saw, an insert axially centered within the large diameter of said body and provided with a series of circumferentially-spaced ribs receiving therebetween the inner longitudinal edges of the saw tooth setting blades, and said ribs at one end being bevelled to engage the intermediate teeth of the saw whereby upon application of force to the saw to cause the latter to move axially of said saw tooth setting assembly the bevelled end portions of said blades and ribs will act on the teeth of the saw for setting the latter.

3. A saw tooth setting assembly for use on a conventional saw tooth setting stand and including a two diameter hollow cylindrical body, said body being provided with a series of circumferentially-spaced slots in the large diameter thereof, said slots equalling in number one half of the total number of teeth with which the saw to be acted upon is equipped, individual saw tooth setting blades removably engaged in said slots and provided at one end with beveled corners to engage alternate teeth of the saw, an insert axially centered within the large diameter of said body and provided with a series of circumferentially-spaced ribs receiving therebetween the inner longitudinal edges of the saw tooth setting blades, and said ribs at one end being bevelled to engage the intermediate teeth of the saw whereby upon application of force to the saw to cause the latter to move axially of said saw tooth setting assembly the bevelled end portions of said blades and ribs will act on the teeth of the saw for setting the latter, and a pilot head at one end of said insert and of a slightly larger diameter than the insert and adapted to fit snugly within the tubular body of the saw, said head cooperating with the bevelled end corners of the saw setting blade for setting alternate teeth of the saw.

4. A device for setting the teeth of tubular saws of the type used on button blank-cutting machines, and comprising a cylindrical two diameter body, said body having a series of circumferentially spaced slots in the large diameter thereof, individual saw tooth setting blades removably engaged in said slots, an insert member arranged within the large diameter of said cylindrical body and provided on its periphery with a series of circumferentially-spaced saw tooth setting ribs receiving therebetween the inner longitudinal edges of the saw teeth setting blades, a gland member threadedly engaged in the small diameter of the body member, a spacer sleeve interposed between said insert and said gland, a rod extending axially through said insert, spacer sleeve and gland, said rod being provided at one end with a pilot head abutting one end of the insert, and said rod being provided at its opposite end with a threaded portion and a nut engaged with said threaded portion whereby said rod serves to secure the insert, sleeve and gland assembled.

5. A device for setting the teeth of tubular saws of the type used on button blank-cutting machines, and comprising a cylindrical two diameter body, said body having a series of circumferential spaced slots in the large diameter thereof, individual saw tooth setting blades removably engaged in said slots, an insert member arranged within the large diameter of said cylindrical body and provided on its periphery with a series of circumferentially-spaced saw tooth setting ribs receiving therebetween the inner longitudinal edges of the saw teeth setting blades, a gland member threadedly engaged in the small diameter of the body member, a spacer sleeve interposed between said insert and said gland, a rod extending axially through said insert, spacer sleeve and gland, said rod being provided at one end with a pilot head abutting one end of the insert, and said rod being provided at its opposite end with a threaded portion and a nut engaged with said threaded portion whereby said rod serves to secure the insert, sleeve and gland assembled, said saw teeth setting blades at their outer ends having bevelled corner portions, and said saw teeth setting ribs having bevelled outer ends as and for the purpose specified.

6. A device for setting the teeth of tubular saws of the type used on button blank-cutting machines, and comprising a cylindrical two diameter body, said body having a series of circumferential spaced slots in the large diameter thereof, individual saw tooth setting blades removably engaged in said slots, an insert member arranged within the large diameter of said cylindrical body and provided on its periphery with a series of circumferentially-spaced saw tooth setting ribs receiving therebetween the inner longitudinal edges of the saw teeth setting blades, a gland member threadedly engaged in the small diameter of the body member, a spacer sleeve interposed between said insert and said gland, a rod extending axially through said insert, spacer sleeve and gland, said rod being provided at one end with a pilot head abutting one end of the insert, and said rod being provided at its opposite end with a threaded portion and a nut engaged with said threaded portion whereby said rod serves to secure the insert, sleeve and gland assembled, said saw teeth setting blades at their outer ends having bevelled corner portions, said saw teeth setting ribs having bevelled outer ends, and a tubular member sleeved on the large diameter of said body for retaining the blades engaged with said body with the inner longitudinal edges of the blade engaged in the spaces between said ribs.

GLENN W. HOPKINS.